United States Patent Office 2,714,067
Patented July 26, 1955

2,714,067

SILAGE PRESERVATIVE

Edward J. Russell, Allentown, Pa., assignor to Trojan Powder Company, a corporation of New York No Drawing. Application March 24, 1954,
Serial No. 418,463

2 Claims. (Cl. 99—8)

This invention relates to a silage additive which acts to preserve the green fodder so as to yield silage of high quality through suppressing undesirable bacteriological activity and aiding desirable bacteriological activity while, at the same time, causing the formation in the silage of a material which is a nutritional requirement and which normally must be added to the diet in some manner. The invention relates more particularly to a silage preservative comprising a mixture of sodium formate and calcium chloride which may advantageously include a water soluble nitrite.

The literature reveals that calcium formate has been used for many years, either alone or preferably in admixture with varying proportions of other materials, as a silage preservative. The literature further reveals that such use has been rewarded with a high degree of success and that silage so preserved is generally superior to silage prepared without additives or to silage preserved with additives other than those based on calcium formate.

On the other hand, the literature reveals that sodium formate has also been used as a silage additive for many years but with indifferent results. More recent references indicate that sodium formate is devoid of preservative action on silage. In one series of tests, silage made with the addition of sodium formate has been reported as being inferior in quality to silage prepared from the same green fodder but without added sodium formate. The varying results obtained through the use of sodium formate appear, therefore, to depend less upon its presence than upon factors which prevail in the absence of an active silage preservative.

When a suitable preservative is added to chopped green fodder of corn, alfalfa, clover or the like, a pH value of 3.5–4.2 is developed which is necessary to prevent the decomposition of the silage, especially the degradation of proteinaceous matter to ammonia. For this reason such materials as sulfur dioxide and hydrochloric acid have been used in spite of their disadvantages and the inconveniences attendant upon their use. Calcium formate is free from the objections referred to, but its necessary initial decomposition is rather slow to start and this tends to retard the beneficial results derived from its use.

I have now discovered that sodium formate may be used in conjunction with calcium chloride to provide a silage preservative with the beneficial effects of calcium formate but without its slow initial action. In this new silage additive, the sodium formate and calcium chloride are present in the ratio of approximately 55 parts of substantially anhydrous sodium formate to approximately 45 parts of substantially anhydrous calicum chloride, this mixture being the major constituent, and other materials of beneficial nature may be added in minor proportions.

In the presence of the moisture in the silage the sodium formate and calcium chloride react in a strongly exothermic manner with the formation of calcium formate. Due to the dilution which necessarily prevails in the silage, this exothermic effect is unable to heat the silage to an undesirable degree but is sufficient to expedite the subsequent decomposition of the calcium formate with resulting acceleration of its action to preserve the silage and repress mold growth. The simultaneous formation of sodium chloride, or common salt, which is not subsequently decomposed, is also beneficial as there is thereby introduced into the feed an important nutritional ingredient which must otherwise be supplied separately. Thus the proportions may be varied, as from 50–60 parts by weight of sodium formate for 100 parts of mixture of it with the calcium chloride and the proportion of the calcium nitrite from 5–15 parts by weight on the dry basis for 100 of the said mixture.

Stated briefly, my invention comprises the product of mixing sodium formate and calcium chloride. In its use there may be added to this mixture other materials found to cause further increase in the degree or rate of preservative action of the mixture such as is the case with soluble nitrites.

The invention is illustrated by the following examples of its use.

*Example 1*

55 kg. of substantially anhydrous sodium formate crystals and 45 kg. of substantially anhydrous calcium chloride granules were well ground in a rotary blender to produce the desired silage additive in the form of a free flowing powder.

*Example 2*

51 lbs. of powdered substantially anhydrous sodium formate, 42 lbs. of powdered substantially anhydrous calcium chloride and 7 lbs. of powdered substantially anhydrous sodium nitrite were thoroughly mixed in a rotary blender to produce a desired silage preservative.

*Example 3*

960 lbs. of sodium formate, 780 lbs. of calcium chloride and 260 lbs. of sodium nitrite, all in the form of substantially anhydrous powders, were thoroughly mixed in a large rotary blender to produce a silage preservative of the widest general application.

It will be recognized that my invention is not limited to the specific examples herein disclosed, but is of broad application, and it should accordingly be understood that the scope of my invention is not limited except as indicated in the appended claims.

Having now particularly described and ascertained the principle of my invention and in what manner the same is to be performed, I declare that what I claim is:

1. A silage preservative comprising a substantially anhydrous mixture of sodium formate and calcium chloride in the proportions of approximately 50–60 parts by weight of the sodium formate for 100 of the mixture.

2. The silage preservative of claim 1 including sodium nitrite admixed in the proportion of 5–15 parts by weight of the nitrite on the dry basis for 100 parts of the said mixture.

No references cited.